US012611979B1

(12) United States Patent
Zhang

(10) Patent No.: US 12,611,979 B1
(45) Date of Patent: Apr. 28, 2026

(54) VEHICLE SLIDE-OUT SYSTEM WITH COMBINED TYPE CANTILEVER RAILS

(71) Applicant: Xinfang Zhang, Shanxi (CN)

(72) Inventor: Xinfang Zhang, Shanxi (CN)

( * ) Notice: Subject to any disclaimer, the term of this patent is extended or adjusted under 35 U.S.C. 154(b) by 0 days.

(21) Appl. No.: 19/009,278

(22) Filed: Jan. 3, 2025

(51) Int. Cl.
*B60P 3/34* (2006.01)
*F16H 19/04* (2006.01)

(52) U.S. Cl.
CPC ................ *B60P 3/34* (2013.01); *F16H 19/04* (2013.01)

(58) Field of Classification Search
CPC ........................................................ B60P 3/34
See application file for complete search history.

(56) References Cited

U.S. PATENT DOCUMENTS

2010/0219652 A1* 9/2010 Reske ........................ B60P 3/34
296/26.13

FOREIGN PATENT DOCUMENTS

| | | | | |
|---|---|---|---|---|
| CN | 119176073 A | * | 12/2024 | ........... B62D 33/077 |
| EP | 4480750 A1 | * | 12/2024 | ............. F16G 13/20 |
| KR | 20240002067 A | * | 1/2024 | ................ B60P 3/36 |

OTHER PUBLICATIONS

Machine translation of CN-119176073-A (Year: 2024).*
Machine translation of EP-4480750-A1 (Year: 2024).*
Machine translation of KR-20240002067-A (Year: 2024).*

* cited by examiner

*Primary Examiner* — Randell J Krug

(57) ABSTRACT

The present application relates to a vehicle slide-out system with combined cantilever rails, comprising a slide-out box, load bearing plate, carrier box, support frame, gear, motor, speed reducer, rack, rack frame, guide rail one, guide rail two, four sliders. The slide-out box is set in the opening of the vehicle body, the slide-out box is provided with two corresponding carrier boxes of the same structure under the opposite side walls. The load bearing plate is fixed on the carrier box, the guide rails are fixed on the carrier box in parallel, the sliders are fixed to the support frame, and the carrier box is provided with a strip opening on the bottom, and the carrier box slides back and forth through the strip opening. The present application is capable of realizing the vehicle slide-out box sliding out and retracting, which increases the space for use of the vehicle.

6 Claims, 5 Drawing Sheets

VEHICLE SLIDE-OUT SYSTEM WITH COMBINED TYPE CANTILEVER RAILS

TECHNICAL FIELD

The present invention relates to the technical field of vehicle interior space expansion, and in particular, relates to a vehicle slide-out system with combined-type cantilever rails.

BACKGROUND OF THE INVENTION

Existing vehicles and caravans are equipped with a slide-out box to increase the interior space of the caravan. The outer wall of the slide-out box is flush with the exterior of the vehicle or trailer during traveling, and when the vehicle stops, the slide-out chamber is slid outwardly from an opening in the vehicle, thereby increasing the interior space of the vehicle.

Patent No. CN202111541306.4 discloses a caravan expansion mechanism and a caravan, wherein the slide-out mechanism is located underneath and on both sides of the body of the vehicle, has no integrated setup, occupies a large amount of space, is inconvenient to install, and does not run smoothly.

Patent No. US202117408020A discloses a slide-out mechanism set on both sides of a slide-out box, due to the complexity of the mechanism used, the height of the telescopic drive device is too high, occupies a large space, is inconvenient to maintain, and increases the cost of use.

For the above-related technology, the inventor believes that the slide-out mechanism of the vehicle box slide-out system is relatively large, complicated to install, and costly. Therefore, it is believed that the slide-out mechanism of the vehicle slide-out system has the problem of occupying a large space.

SUMMARY OF THE INVENTION

In order to improve the problem of occupying a large space of the slide-out mechanism of the vehicle slide-out box, the present invention provides a vehicle slide-out system with combined type cantilever rails, which is able to increase the space of the vehicle and improve the space utilization rate and because the whole slide-out mechanism inside the carrier box is integrated and connected to the support frame bottom plate, it is not necessary to disassemble the lower chassis of the vehicle body, and it is easy to install and disassemble, and it is only necessary to fix the support frame bottom plate to the vehicle body, and then the slide-out mechanism can be installed and disassembled. The entire slide-out box can be set in the opening of the vehicle body by fixing the bottom plate of the support frame on the vehicle body.

DETAILED DESCRIPTION OF THE PREFERRED EMBODIMENTS

In order to realize the above purpose, the present invention adopts the following technical solution:

A vehicle slide-out system with combined cantilever rails, including a slide-out box, a carrier box, a bearing plate, a support frame, a gear, a motor, a reducer, a rack, a rack frame, a guide rail one, a guide rail two, four sliders. Slide-out box is set in the opening of the vehicle body, and there are corresponding carrier boxes under the opposite side walls of the slide-out box, and the internal structure of the two carrier boxes is the same, and they are set up correspondingly with synchronized movement, and load bearing plate is fixed to carrier box, and the output shaft of motor is connected to the speed reducer, and the speed reducer is fixed to the supporting frame, and the output shaft is connected to a gear pass through the supporting frame, rack is fixed on load bearing plate through rack frame, gear meshes with rack, guide rail one and guide rail two are fixed on carrier box through load bearing plate in parallel up and down, slider one and slider three are connected with guide rail one in a sliding manner, slider two, slider four slidingly connected to guide rail two, slider one, slider two, slider three, slider four fixed to support frame. Load bearing plate, supporting frame, gear, motor, reducer, rack, rack frame, guide rail one, guide rail two, slider one, slider two, slider three, and slider four (except for the bottom plate) are integrally disposed inside load carrier box, the bottom of carrier box is provided with a strip opening, through which carrier box slides back and forth at the lower end of support frame.

By adopting the above technical solution, the motor drives the speed reducer to rotate, the speed reducer drives the gear to rotate, the gear drives the rack to turn the spiral motion into a straight line motion, and is able to pull the carrier box to slide back and forth, realizing the sliding out and retrieval of the slide-out box. load bearing plate, gear, motor, reducer, rack, rack frame, guide rail one, guide rail two, slider one, slider two, slider three, slider four, load bearing plate, part of the support frame (except for the bottom plate) is integrated in the carrier box, can isolate the outside influence, easy to install and dismantle, beautiful appearance and increase the vehicle's internal use of space. The bottom strip opening of the carrier box slide along the lower end of the support frame, and the bottom plate supports the entire slide-out box, so that there is no need to dismantle the chassis of the vehicle, and the bottom plate of the support frame is directly fixed to the body of the vehicle, so that the entire slide-out box is suspended in the opening of the vehicle, and the support frame transfers the weight of the slide-out box to the body of the vehicle.

Guide rail one and guide rail two drive the slide-out box in and out through fixed slider one, slider two, slider three and slider four, and remain cantilever set. By adopting the above technical solution, the cantilever rail one and two increase the length of the slide-out box sliding out and increase the space for use in the vehicle without the need for additional support.

Sliders one and two are vertically aligned, as are sliders three and four, and sliders one and three are in a straight line, parallel to sliders two and four. By adopting the above technical solution, when the guide rail one and guide rail two slide back and forth, the force is balanced, the operation is smooth and the friction is small.

Support frame comprises a vertical plate, a bottom plate, and reducer is fixed on vertical plate. By adopting the above technical solution, the speed reducer is fixed on the vertical plate to remain immobile, and the support frame bears the speed reducer.

Slider one and slider three are fixed to the upper part of vertical plate and slider two and slider four are fixed to the lower part of vertical plate. By using the above technical solution, the slider is kept immobile and the guide rail is able to move through the slider.

Bottom plate is fixed to the vehicle body. By adopting the above technical solution, the weight borne by the support frame is able to be transferred to the vehicle body through the bottom plate.

Load bearing plate, carrier box and rack are parallel along the length direction. By adopting the above technical solution, when the rack drives the load bearing plate to move, and then drives the carrier box to slide back and forth, it can ensure that the force is balanced during the movement, the operation is smooth, and the friction force suffered is small.

A removable access plate is provided on the side of carrier box near the interior of the carriage. By adopting the above technical solution, it is convenient to install, and when a fault occurs inside the carrier box, it can be repaired by removing the access plate, reducing the maintenance cost.

In summary, the present application includes at least one of the following beneficial technical effects:

1. The load bearing plate, the support frame, the gear, the motor, the reducer, the rack, the rack frame, the guide rail one, the guide rail two, the slider one, the slider two, the slider three, the slider four, and part of the support frame (except for the bottom plate) are integrally set inside the carrier box, which can be insulated from external influences, is convenient to be installed and disassembled, and has an aesthetic appearance and is able to increase the vehicle's internal space for use.

2. Since the whole slide-out mechanism inside the carrier box is integrated and connected to the bottom plate of the support frame, there is no need to dismantle the lower chassis of the vehicle body, so it is easy to install and dismantle, and only the bottom plate of the support frame is fixed to the vehicle body, then the whole slide-out box is set in the opening of the vehicle body, and the support frame transfers the weight of the slide-out box to the vehicle body.

3. The access plate on the carrier box is removable, and when a fault occurs inside the carrier box, it can be repaired by removing the access plate, reducing the maintenance cost.

BRIEF DESCRIPTION OF THE DRAWINGS

In order to more clearly illustrate the technical solution of the present invention, the following will briefly introduce the accompanying drawings that need to be used in the description, and it is obvious that the accompanying drawings in the following description are only some embodiments of the present invention, and for the ordinary technical personnel in the field, without creative labor, other accompanying drawings can be obtained according to these drawings.

4

Figure 8:
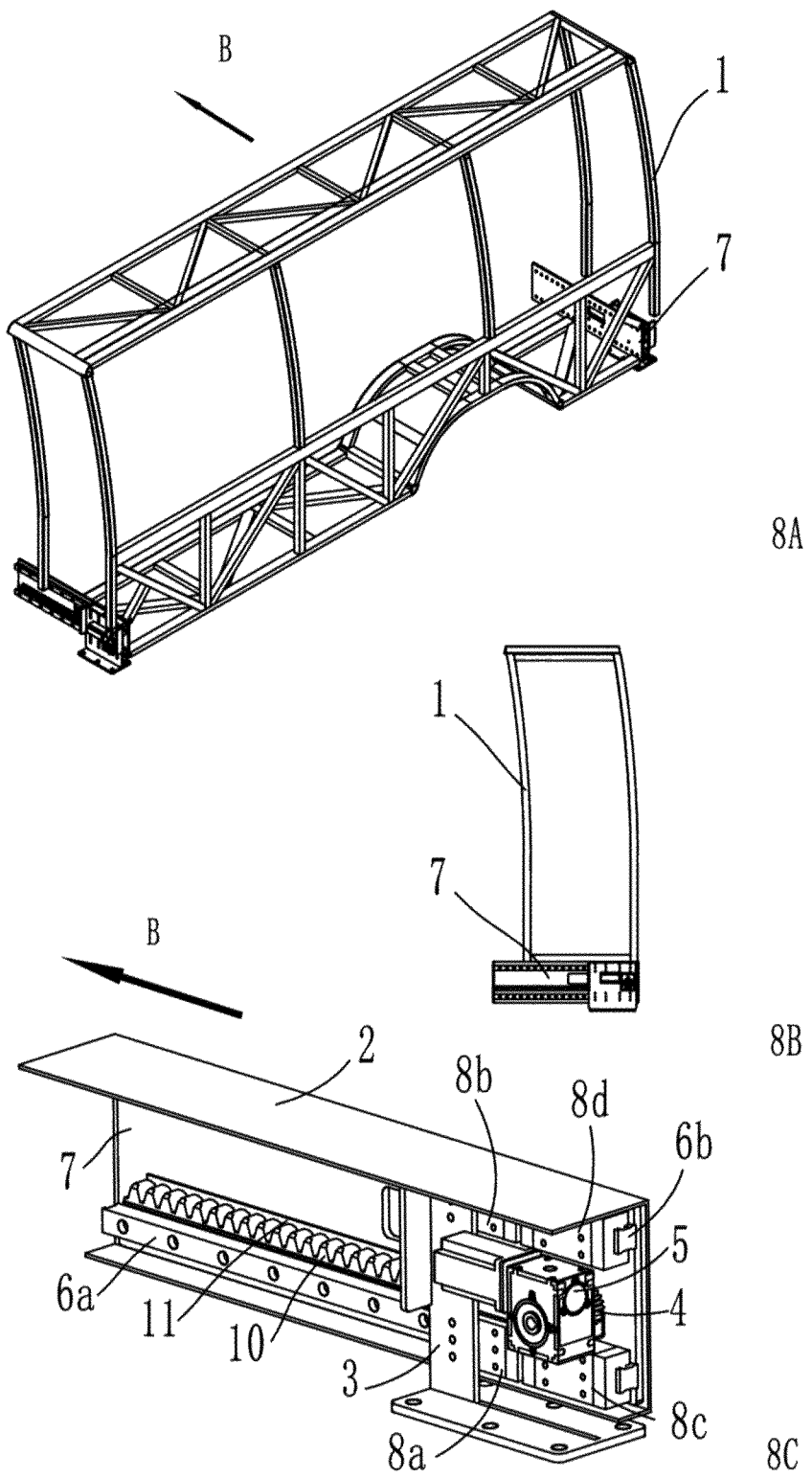

FIG. 8, in which 8A is an oblique view of the slide-out box retracted; 8B is a side view of the slide-out box retracted; 8C is a sectional view of the carrier box after the slide-out box is retracted.

BRIEF DESCRIPTION OF THE FIGURES

Follow are the reference numbers appear in the drawings:
1. Slide-out box
2. Load-bearing box; 203. Access plate
3. Support frame; 3a. Vertical plate; 3b. Bottom plate
4. Gear
5. Motor
12. Gearbox
10. Rack
11. Rack frame
6a. Guide rail one; 6b. Guide rail two
8a. Slider one; 8b. Slider two; 8c. Slider three; 8d. Slider four
9. Strip opening
15. Vehicle body

DETAILED DESCRIPTION OF THE
INVENTION

In order to make the objects, features, and advantages of the present invention more obvious and understandable, the following will be combined with the accompanying drawings in the present specific embodiment to provide a clear and complete description of the technical solutions in the present invention, and it is obvious that the embodiments described below are only a part of the embodiments of the present invention and not all of the embodiments. Based on the embodiments in this patent, all other embodiments obtained by the person of ordinary skill in the art without making creative labor are within the scope of protection of this patent.

Figure 1:
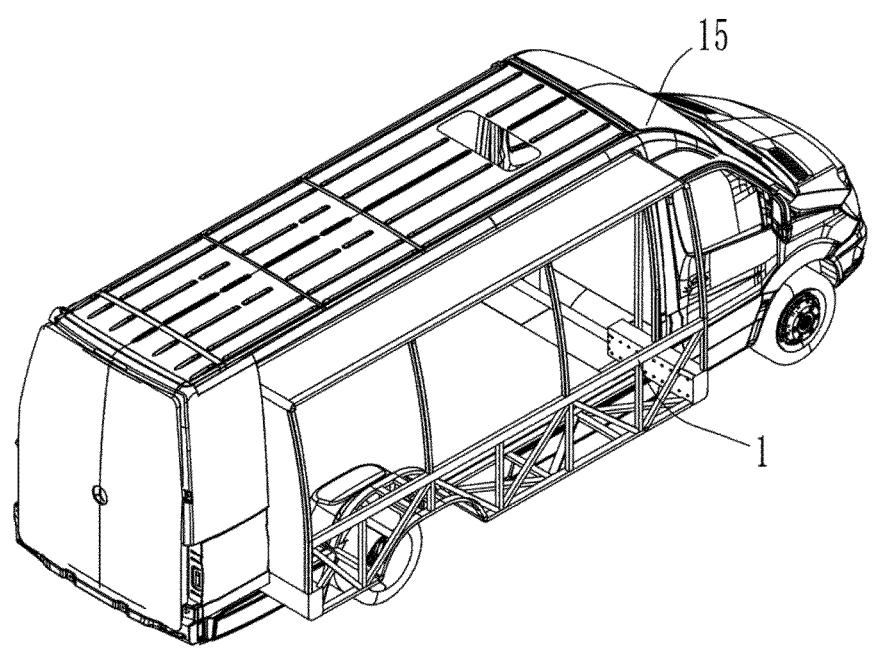
FIG. 1 shows an oblique view of a slide-out box sliding out of an opening in the vehicle body in a specific embodiment of the present invention.
Figure 2:
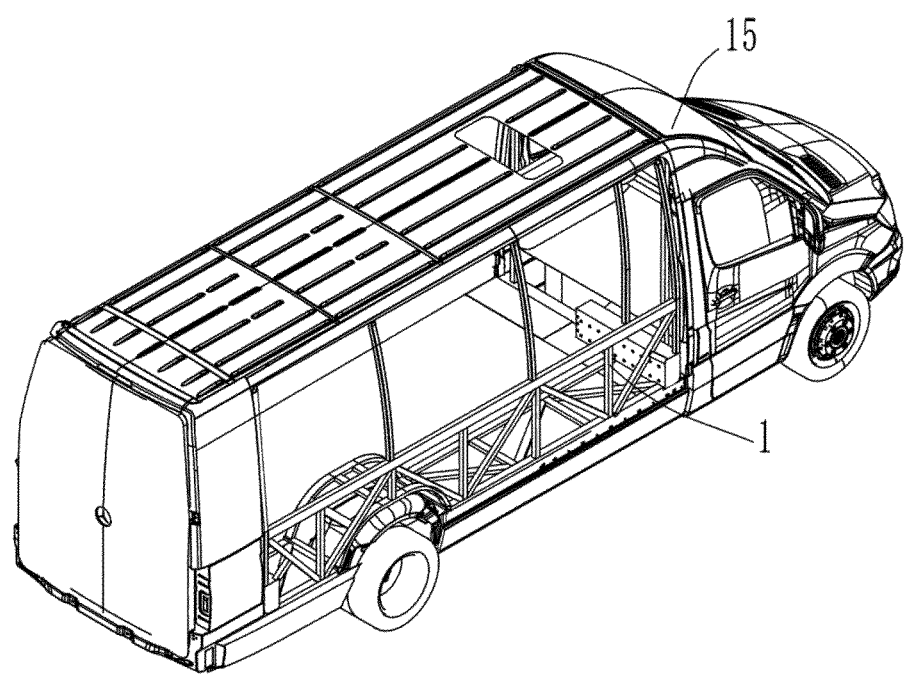
FIG. 2 shows an oblique view of the slide-out box fully retracted from the opening of the vehicle body in a specific embodiment of the present invention.

Referring to FIGS. 1 and 2, slide-out box 1 is provided in the opening of the vehicle body 15, when the vehicle is stationary, the slide-out box 1 slides out completely from the opening of the vehicle body 15, increasing the use space inside the vehicle, and the slide-out box 1, after being retracted, is flush with the appearance of the vehicle body 15, without affecting the overall aesthetic effect.

Figure 3:
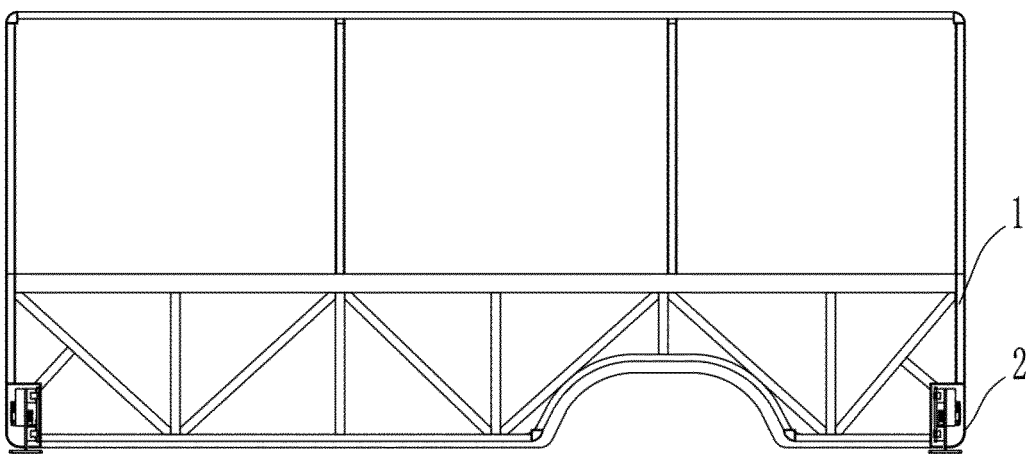
FIG. 3 shows a front cross-sectional view of the slide-out box in a specific embodiment of the present invention.
Figure 4:
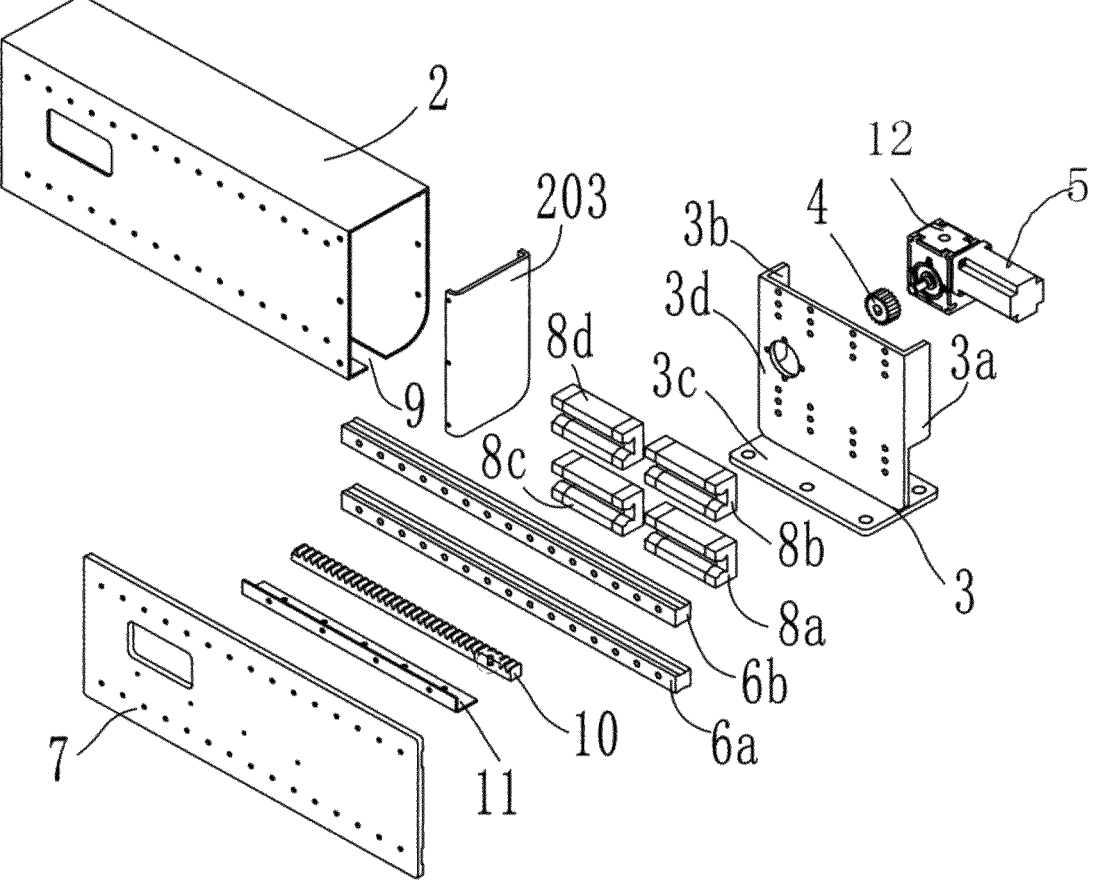
FIG. 4 shows a schematic view of the slide-out mechanism in a specific embodiment of the present invention.

Referring to FIGS. 3 and 4, a vehicle slide-out system with combined type cantilever rails includes a slide-out box 1, a carrier box 2, a load bearing plate 7, a support frame 3, a gear 4, a motor 5, a reducer 12, a rack 10, a rack frame 11, a guide rail 6a, a guide rail 6b, a slider 8a, a slider one 8b, a slider two 8c, a slider four 8d, and a slider four 8d. The slide-out box 1 is made of aluminum alloy or other materials with lighter structural rigidity, and the slide-out box 1 is provided with two corresponding carrier boxes 2 under the opposite side wall, and the two carrier boxes 2 have the same internal structure, are set up correspondingly, and move synchronously to carry the weight of the slide-out box 1. gear 4, motor 5, reducer 12, rack 10, rack frame 11, guide rail one 6a, guide rail two 6b, slider one 8a, slider two 8b, slider three 8c, slider four 8d, load bearing plate 7, and part of the support frame 3 (except for the bottom plate) are integrally provided inside the carrier box 2, which can save space and facilitate quick installation and disassembly.

Figure 5:
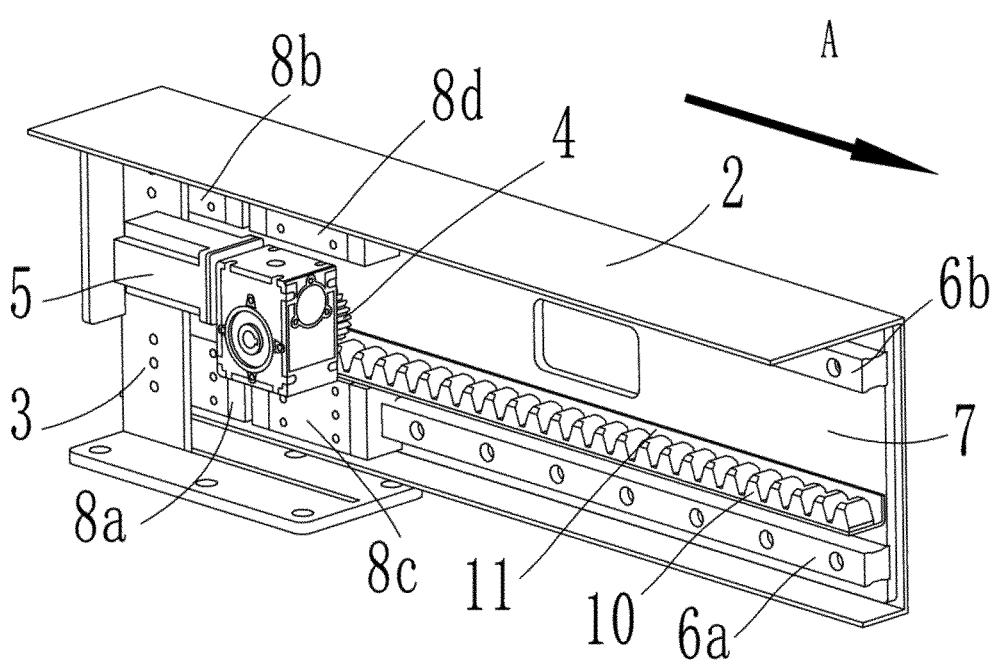
FIG. 5 is a semi-sectional view of the interior of the carrier box when the slide-out box is completely slid out in the specific embodiment of the present invention.
Figure 6:
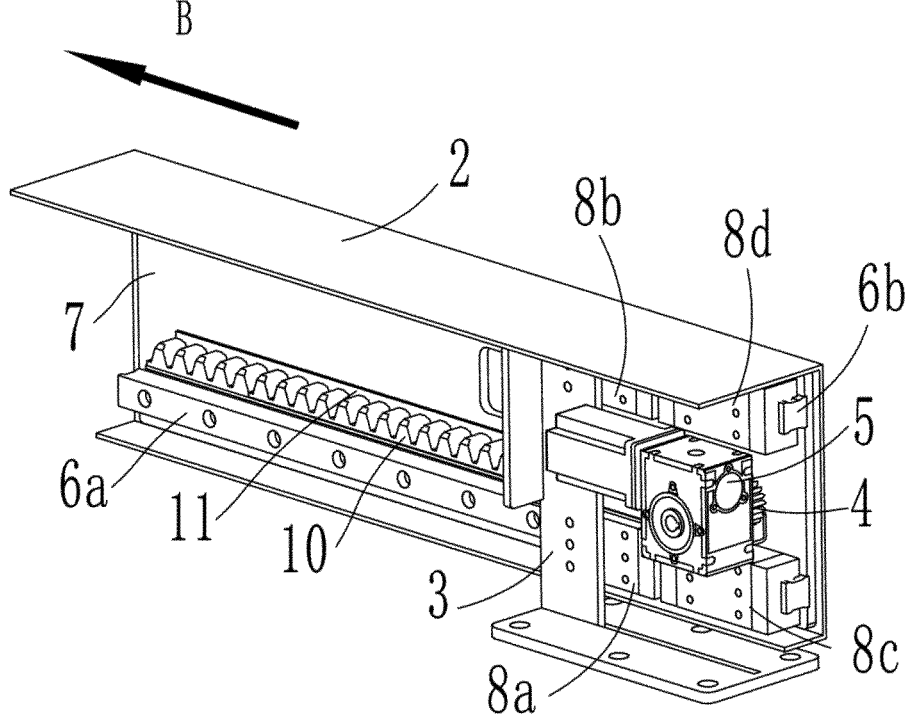
FIG. 6 shows a semi-sectional view of the interior of the carrier box when the slide-out box is fully retracted in a specific embodiment of the present invention.

Referring to FIGS. 5 and 6, load bearing plate 7 is fixed on carrier box 2, the support frame 3 includes vertical plate 3a and bottom plate 3b, the output shaft of motor 5 is connected to the gearbox 12, the gearbox 12 is fixed on vertical plate 3a, the output shaft is connected to the gear 4 pass through the vertical plate 3*a*, the rack 10 is fixed on load bearing plate 7 through the rack frame 11, the gear 4 meshes with the rack 10, load bearing plate 7, carrier box 2 and rack 10 being parallel along the length. guide rail one 6*a* and guide rail two 6*b* are fixed to load bearing plate 7 in parallel. slider one 8*a*, slider three 8*c* are slidably connected to guide rail one 6*a*, slider two 8*b*, slider four 8*d* are slidably connected to guide rail two 6*b*. And slider one 8*a* and slider three 8*c* are fixed to the upper part of the vertical plate 3*a*, slider two 8*b* and slider four 8*d* are fixed to the lower part of vertical plate 3*a*, sliders one 8*a* and two 8*b* are vertically aligned, as are sliders three 8*c* and four 8*d*, and sliders one 8*a* and three 8*c* are in a straight line, parallel to sliders two 8*b* and four 8*d*. The guide rail one 6*a* and guide rail two 6*b* are always cantilevered when extending and retracting the slide-out box 1 by means of fixed slider one 8*a*, slider two 8*b*, slider three 8*c* and slider four 8*d*. The carrier box 2 is provided with a removable access plate 203 near the interior side of the carriage, so that the carrier box 2 can be installed and accessed by removing the access plate 203, and the bottom of the carrier box 2 is provided with a strip opening 9, and the carrier box 2 slides back and forth on both sides of the support frame 3 through the strip opening 9.

Figure 7:
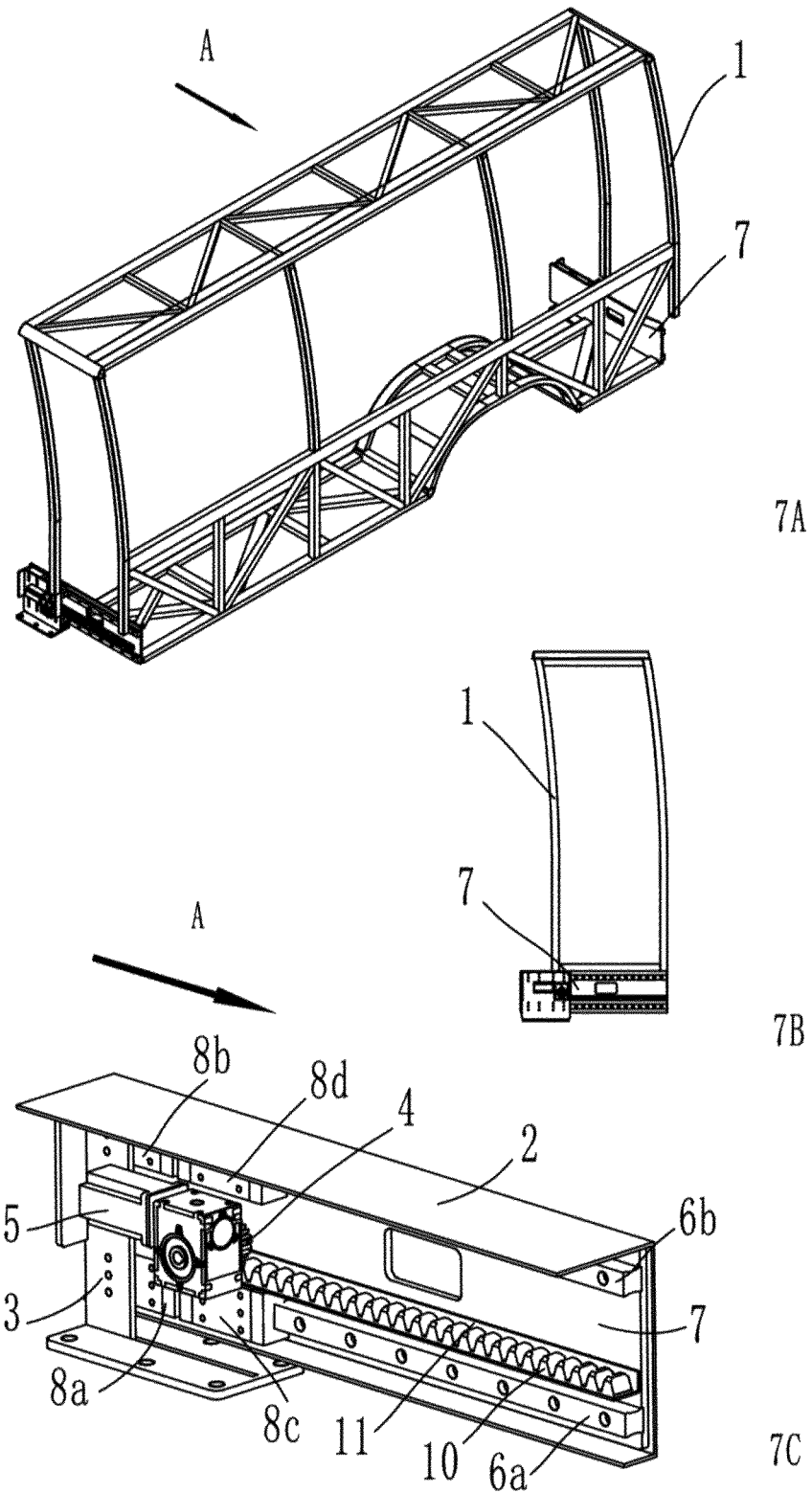
FIG. 7, in which 7A shows an oblique view of the slide-out box extended; 7B shows a side view of the slide-out box extended; 7C shows a sectional view of the carrier box after the slide-out box is extended.

Referring to FIG. 7, when the vehicle slide-out box is extended, the motor 5 drives the reducer 12 to rotate, the gear 4 rotates under the action of the reducer 12, and the rack 10, under the action of the gear 4, transforms the spiral motion into a straight line motion, driving the carrier box 2 and the load bearing plate 7 to slide outwardly through the guide rail one 6*a* and the guide rail two 6*b* together, and the slide-out process is ended when the slide reaches a set length. The support frame 3 remains motionless, and after the slide-out box 1 is slid out, the carrier box 2 transfers the weight of the slide-out box 1 to the load bearing plate 7, and the load bearing plate 7 is transferred to the slider one 8*a*, the slider two 8*b*, the slider three 8*c*, and the slider four 8*d* through the guide rail one 6*a* and the guide rail two 6*b*, and then to the support frame 3, which is finally transferred to the vehicle body 15.

Referring to FIG. 8, when the vehicle slide-out box is retracted, the motor 5 drives the reducer 12 to reverse rotation, the gear 4 reverses under the action of the reducer 12, and the rack 10, under the action of the gear 4, transforms the spiral motion into a straight line motion, driving the carrier box 2 and the load bearing plate 7 to retract inwardly together through the guide rail one 6*a* and the guide rail two 6*b*, and the process of retracting is completed when the slide-out box 1 and the vehicle body 15 are flush with the exterior, and the retraction process ends.

The foregoing description of the disclosed embodiments enables those skilled in the art to realize or use the present invention. Various modifications to these embodiments will be apparent to those skilled in the art, and the general principles defined herein may be realized in other embodiments without departing from the spirit or scope of the present invention. Accordingly, the present invention will not be limited to these embodiments shown herein, but will be subject to the broadest scope consistent with the principles and novel features disclosed herein.

What is claimed is:

1. A vehicle slide-out system with combined cantilever rails comprising:
a slide-out box mounted within an opening of a vehicle body;
a carrier box provided with a strip opening at the bottom and disposed below opposite side walls of the slide-out box and configured to move synchronously;
a load bearing plate fixed to the carrier box;
a support frame including a vertical plate and a bottom plate, the bottom plate being fixed to the vehicle body;
a gear, a motor, and a reducer fixed to the vertical plate of the support frame and configured to drive a rack fixed to the load bearing plate through a rack frame;
a pair of guide rails arranged in parallel in the carrier box through the load bearing plate and cooperating with a plurality of sliders fixed to the support frame;
wherein the guide rails are cantilevered and entirely integrated within the carrier box to achieve slide-out and retraction of the slide-out box, and the support frame transfers the weight of the slide-out box to the vehicle body through the bottom plate.

2. A vehicle slide-out system with combined cantilever rails according to claim 1, wherein the guide rails remain cantilever set during movement.

3. A vehicle slide-out system with combined type cantilever rails according to claim 2, wherein four sliders remain flush both horizontally and vertically.

4. A vehicle slide-out system with combined type cantilever rails according to claim 3, wherein two sliders are fixed to an upper part of the vertical plate, and the other two sliders are fixed to a lower part of the vertical plate.

5. A vehicle slide-out system with combined type cantilever rails according to claim 4, wherein the load bearing plate, the carrier box and the rack are parallel along the length.

6. A vehicle slide-out system with combined type cantilever rails according to claim 5, wherein the carrier box is provided with a removable access plate.

* * * * *